United States Patent
Vu et al.

(10) Patent No.: US 7,434,605 B2
(45) Date of Patent: Oct. 14, 2008

(54) TIRE FOR HEAVY VEHICLE

(75) Inventors: Hien Vu, Chamalieres (FR); Gilles Godeau, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 238 days.

(21) Appl. No.: 11/282,366

(22) Filed: Nov. 17, 2005

(65) Prior Publication Data

US 2006/0124215 A1    Jun. 15, 2006

Related U.S. Application Data

(63) Continuation of application No. PCT/EP2004/005646, filed on May 26, 2004.

(30) Foreign Application Priority Data

May 28, 2003    (FR) .................................. 03 06542

(51) Int. Cl.
*B60C 1/00* (2006.01)
*B60C 3/04* (2006.01)
*B60C 9/08* (2006.01)
*B60C 11/11* (2006.01)

(52) U.S. Cl. .................. 152/209.12; 152/209.14; 152/454; 152/556; 152/905

(58) Field of Classification Search ............. 152/209.12–209.14, 454, 556, 905
See application file for complete search history.

(56) References Cited

U.S. PATENT DOCUMENTS

| | | | | |
|---|---|---|---|---|
| 2,821,232 A | * | 1/1958 | Wolf | 152/905 X |
| 3,074,455 A | * | 1/1963 | Richey | 152/454 |
| 4,096,900 A | * | 6/1978 | Olsen | 152/454 X |
| 4,155,394 A | * | 5/1979 | Shepherd et al. | 152/556 X |
| 4,480,672 A | | 11/1984 | Marshall et al. | |
| 5,259,429 A | * | 11/1993 | Harms | 152/209.12 |
| 5,803,999 A | * | 9/1998 | Shibata | 152/209.14 |
| 6,058,996 A | * | 5/2000 | Suzuki | 152/454 X |
| 6,073,668 A | * | 6/2000 | Iwasaki et al. | 152/209.14 |
| 6,598,640 B1 | * | 7/2003 | Reynolds et al. | 152/454 X |

FOREIGN PATENT DOCUMENTS

| | | | |
|---|---|---|---|
| EP | 0 502 694 A1 | * | 9/1992 |
| EP | 0 872 361 | | 10/1998 |
| GB | 1 587 963 | * | 4/1981 |
| JP | 60148702 A | * | 8/1985 |
| JP | 401060404 A | * | 3/1989 |
| JP | 03248902 A | * | 11/1991 |
| JP | 06087305 A | * | 3/1994 |
| JP | 2003054214 A | * | 2/2003 |

* cited by examiner

*Primary Examiner*—Adrienne C Johnstone
(74) *Attorney, Agent, or Firm*—Cohen Pontani Lieberman & Pavane LLP

(57) ABSTRACT

The invention relates to a tire for heavy vehicle of the agricultural or construction type, comprising a carcass reinforcement radially surmounted by a crown reinforcement, itself topped radially by a tread, said tread being joined to two beads by means of two sidewalls. According to the invention, the tire is such that the form ratio H/S is less than 0.75 and the ratio of the width of the tread A to the height of deflection B of the crown is greater than 17.

13 Claims, 4 Drawing Sheets

TIRE FOR HEAVY VEHICLE

This application is a U.S. Continuation Application of International Application PCT/EP2004/005646 filed on May 26, 2004.

FIELD OF THE INVENTION

The present invention relates to a tire, intended to be fitted on heavy vehicle of the agricultural or construction type, more particularly an agricultural tractor, said tire comprising at least one carcass reinforcement radially surmounted by a tread.

BACKGROUND OF THE INVENTION

The reinforcement armature or reinforcement of tires and in particular of tires for agricultural vehicle is currently—and most frequently—formed by stacking one or more plies conventionally referred to as "carcass plies", "crown plies", etc. This manner of designating the reinforcement armatures is derived from the manufacturing process, which consists of producing a series of semi-finished products in the form of plies, provided with cord reinforcing threads which are frequently longitudinal, which products are then assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, to obtain a product ready to be vulcanized.

Such a type of "conventional" process involves, in particular for the phase of manufacture of the blank of the tire, the use of an anchoring element (generally a bead wire), used for anchoring or holding the carcass reinforcement in the zone of the beads of the tire. Thus, in this type of process, a portion of all the plies constituting the carcass reinforcement (or only a part thereof) is turned up around a bead wire arranged in the tire bead. In this manner, the carcass reinforcement is anchored in the bead.

The general adoption of this type of conventional process in the industry, despite the numerous different ways of producing the plies and assemblies, has led the person skilled in the art to use a vocabulary which reflects the process; hence the generally accepted terminology, comprising in particular the terms "plies", "carcass", "bead wire", "shaping" to designate the change from a flat profile to a toroidal profile, etc.

There are nowadays tires which do not, properly speaking, comprise "plies" or "bead wires" in accordance with the preceding definitions. For example, document EP 0 582 196 describes tires manufactured without the aid of semi-finished products in the form of plies. For example, the reinforcement elements of the different reinforcement structures are applied directly to the adjacent layers of rubber mixes, the whole being applied in successive layers to a toroidal core the form of which makes it possible to obtain directly a profile similar to the final profile of the tire being manufactured. Thus, in this case, there are no longer any "semi-finished products", nor "plies", nor "bead wires". The base products, such as the rubber mixes and the reinforcement elements in the form of cords or filaments, are applied directly to the core. As this core is of toroidal form, the blank no longer has to be shaped in order to change from a flat profile to a profile in the form of a torus.

Furthermore, the tires described in this document do not have the "conventional" upturn of the carcass ply around a bead wire. This type of anchoring is replaced by an arrangement in which circumferential cords are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising at the same time certain semi-finished products to produce certain architectural aspects (such as plies, bead wires, etc.), whereas others are produced from the direct application of mixes and/or reinforcement elements.

In the present document, in order to take into account recent technological developments both in the field of manufacture and in the design of products, the conventional terms such as "plies", "bead wires", etc., are advantageously replaced by neutral terms or terms which are independent of the type of process used. Thus, the term "carcass-type reinforcing thread" or "sidewall reinforcing thread" is valid as a designation for the reinforcement elements of a carcass ply in the conventional process, and the corresponding reinforcement elements, generally applied at the level of the sidewalls, of a tire produced in accordance with a process without semi-finished products. The term "anchoring zone", for its part, may equally well designate the "traditional" upturn of a carcass ply around a bead wire of a conventional process and the assembly formed by the circumferential reinforcement elements, the rubber mix and the adjacent sidewall reinforcement portions of a bottom zone produced with a process using application on a toroidal core.

With regard to the usual design of tires for agricultural vehicle, the carcass reinforcement, anchored within each bead, is composed of at least one layer of textile and/or metallic reinforcement elements, said elements being substantially parallel to each other in the layer and possibly being substantially radial and/or clearly crossed from one ply to the next, forming equal or unequal angles with the circumferential direction. The carcass reinforcement is usually surmounted by a crown reinforcement composed of at least two working crown layers of reinforcement elements which may be textile or metallic ones, but which are crossed from one layer to the next, forming small angles with the circumferential direction. The tread of the tire in question is formed of blocks of rubber or bars, inclined relative to the circumferential direction by a generally large angle, and separated circumferentially from each other by hollows having a width (measured in the circumferential direction) greater than the average width of the bars. Said bars may be symmetrical to each other relative to the equatorial plane, being axially continuous or, as in the majority of cases, axially discontinuous. The ends of bars axially close to the equatorial plane are then in the majority of cases offset circumferentially relative to one another, while having what is commonly called a chevron design.

Tires for agricultural vehicle, such as described above, are usually subject to a pressure of between 1.1 and 1.4 bar in order to use the vehicle on cultivated land for conventional loads and dimensions, corresponding to a maximum amount of deflection of the tire of less than 28%.

The maximum amount of deflection is defined as being the maximum deflection divided by the height of the sidewall H, which is defined later.

The deflection of a tire is defined by the radial deformation of the tire, or variation in radial height, when it changes from a non-loaded state to a statically loaded state, under rated load and pressure conditions.

When this same agricultural vehicle has to travel on hard ground or on roads, at higher speeds, it is necessary to have higher pressures, which may be as much as 2 bar, in order to retain satisfactory endurance of these tires and prevent excessively fast wear.

To perform these changes of pressure, it is necessary to have a device such as a compressor or a pressurized air reserve, generally on board the machine, the latter by definition being on the move when it becomes necessary to increase the pressure of the tires.

The major drawback of these devices, in addition to their presence, their cost and their maintenance, is the time necessary to change the pressure of the tires.

Furthermore, one current requirement of users is to reduce still further the risk of damage to crops during use on cultivated land due to the crushing of said crops when the vehicles, and more specifically the tires, pass over them.

The large amount of research carried out by the Applicant relating to modifications of meridian profiles of treads, of meridian profiles of carcass reinforcements, of the material of the carcass and crown reinforcements, modifications of design and dimensions of tread-pattern blocks has not, to date, provided the expected improvements.

It is furthermore known to use dual tires, which may make it possible to limit the crushing by reducing the pressure of each of the tires while maintaining the loading capacity. However, such solutions lead to problems of bulk in particular on roads.

SUMMARY OF THE INVENTION

One aim of the invention is thus to provide tires for agricultural vehicle which make it possible to reduce the damage to crops, in particular due to compacting or crushing due to the passage of the agricultural machine, without the aforementioned drawbacks.

The tire for vehicle, according to the invention, comprises a carcass reinforcement radially surmounted by a crown reinforcement, which itself is topped radially by a tread, said tread being joined to two beads by means of two sidewalls, the form ratio H/S being less than 0.75 and the ratio A/B of the width of the tread A to the meridian height of deflection of the crown B being greater than 17.

The form ratio H/S is the ratio of the height H of the tire on its rim to the maximum axial width S of the tire, when the latter is mounted on its operating rim and inflated to its recommended pressure. The height H is defined as the difference between the maximum radius of the tread and the minimum radius of the bead.

The width of the tread A is measured on a meridian profile in the axial direction between the shoulder ends, when the tire is mounted on its operating rim and inflated to its recommended pressure; it corresponds to the width during travel, in the axial direction, of the surface in contact with flat ground.

The meridian height of deflection B of the crown is measured on a meridian profile in the radial direction, when the tire is mounted on its operating rim and inflated to its recommended pressure. The meridian height of deflection B is defined as the difference between the maximum radius of the tread and the minimum radius of the tread; the maximum radius of the tread is measured in the equatorial plane and the minimum radius of the tread is measured at one shoulder end.

A shoulder end is defined, in the zone of the shoulder of the tire, when the latter is mounted on its operating rim and inflated to its recommended pressure, by the projection orthogonal to the outer surface of the tire of the intersection of the tangents to the surfaces of an axially outer end of the tread (apex of the bars) on one hand and of the radially outer end of a sidewall on the other hand.

"Axial" is understood to mean a direction parallel to the axis of rotation of the tire; this direction may be "axially inner" when it is directed towards the inside of the tire and "axially outer" when it is directed towards the outside of the tire.

"Radial" is understood to mean a direction perpendicular to the axis of rotation of the tire and passing through this axis of rotation. This direction may be "radially inner" or "radially outer" depending on whether it is directed towards the axis of rotation or towards the outside of the tire.

The axis of rotation of the tire is the axis around which it rotates in normal use.

The circumferential direction of the tire, or longitudinal direction, is the direction corresponding to the periphery of the tire and defined by the direction of rolling of the tire. At any point, it is perpendicular to the radial and axial directions.

A radial or meridian plane is a plane containing the axis of rotation of the tire.

A circumferential plane is a plane perpendicular to the axis of rotation of the tyre.

The circumferential median plane, or equatorial plane, is a plane which is perpendicular to the axis of rotation of the tire and divides the tire into two halves.

The results of the tests performed show that using a tire thus defined makes it possible to reduce the risks of damage to crops when traveling in fields, in particular by better distribution of the pressure at the level of the contact surface with the.

One advantageous embodiment of the invention provides for the ratio of the width of the tread A to the meridian height of deflection B of the crown to be less than 37.

The tire thus defined according to this advantageous embodiment of the invention may be used at a pressure of 1 bar or less for conventional loads and dimensions without reducing the other properties and in particular the wear in comparison with conventional tires.

In the same manner, the tire thus defined can permit an increase in the load for conventional pressures and dimensions.

The tire thus produced according to the invention is then used under conditions such that the amount of deflection thereof is greater than 28%.

It would appear in fact that the combination of a form ratio smaller than those of conventional tires with a ratio A/B of the width of the tread to the height of deflection of the crown of greater than 17 and less than 37, which results in a crown of the tire and more exactly a meridian profile of the tread having a radius of curvature greater than that of conventional tires, results in such performances.

According to a preferred embodiment of the invention, the ratio A/S of the width of the tread A to the maximum axial width S of the tire is greater than 0.9.

According to this preferred embodiment of the invention, the results of the tests show performance in terms of crushing and compacting which is even more advantageous; it would appear that this embodiment which defines a ratio A/S greater than 0.9, which results in a greater width of tread than that of a conventional tire for a given maximum axial width of the tire, also results in an improvement in performance when used at pressures less than the conventional use pressures for conventional loads and dimensions.

According to one advantageous embodiment of the invention, the product of the ratios A/B, of the width of the tread to the height of deflection of the crown, and A/S, of the width of the tread A to the maximum axial width S of the tire, is greater than 14, and preferably greater than 16.

According to one preferred embodiment of the invention, the radial carcass reinforcement of the tire comprising at least one layer of radially oriented reinforcement elements, the distance U between the radially innermost layer of radially oriented reinforcement elements and the centre of the chord, of a length D equal to 20% of the maximum axial width S of the tire, forming an angle of 45° with the direction perpendicular to the axis of rotation and placed between two points of the inner wall of the tire, is between 0.21×D and 0.33×D; according to this embodiment of the invention, the distance U is measured in the direction perpendicular to the orientation of said chord.

The distance U is measured on a meridian section of a tire in a shoulder zone which does not comprise bars; in other words, the measurement is effected in a shoulder zone between two bars.

Furthermore, this distance U is measured with an axial distance between the axially outer ends of the beads such that the ratio between the maximum axial width S of the tire and this distance is less than 1.2.

Such an embodiment of the invention, which corresponds to a definition of the radius of curvature at the shoulder, results in particular in an improvement in the endurance performance of the tire.

One advantageous variant of the invention provides, when the tire is mounted on its operating rim, for the ratio S/L of the maximum axial width S of the tire to the rim width L to be less than 1.2.

The rim width L is defined as the distance measured in the axial direction between the rim seats and therefore between the axially outer ends of the beads when the tire is mounted on its rim.

It appears that the tires produced according to this variant of the invention can be used on hard ground such as roads without it being necessary to modify the pressure, which is selected as indicated previously advantageously to be equal to 1 bar or less, because the use of wide rims makes it possible in particular to improve the on-road behavior. Such an embodiment is very advantageous since it will enable the user to carry out agricultural activities between on-road journeys without having to change the pressure of the tires. Furthermore, as explained previously, this will make it possible to design vehicle without supplementary equipment for effecting increases in pressure. It thus turns out that vehicle fitted with tires as described according to the invention permit greater yields since none of the stages of changing pressure are necessary any longer.

Furthermore, the tires thus defined according to the invention permit such on-road travel with acceptable wear, in particular owing to their characteristic A/B which is greater than 17.

One preferred embodiment of the invention further provides for the tread to be made of a rubber of low hysteresis loss such that the hysteresis losses HL are less than 34%.

The hysteresis losses HL are measured as a percentage by rebound at 60° C. at the sixth impact, in accordance with the equation $HL(\%)=100\times(W_0-W_1)/W_1$, with $W_0$: energy supplied and $W_1$: energy restored.

According to this preferred embodiment of the invention, the agricultural vehicle may be used on-road at higher speed without any risk of premature deterioration of the tires. Speeds greater than 50 km/h may be obtained with pressures of less than 1 bar for conventional loads and dimensions.

The tread is thus advantageously produced with rubber mixes the cross-linked rubber composition having reduced hysteresis losses of which is based on at least one diene elastomer the molar ratio of units resulting from conjugated diene(s) of which is greater than 50%.

"Diene elastomer" is understood to mean, in known manner, an elastomer (homopolymer or copolymer) which has resulted at least in part from diene monomers (monomers bearing two double carbon-carbon bonds, whether conjugated or not).

Said or each diene elastomer usable in the tread composition according to the invention is said to be "highly unsaturated", i.e. having an amount of units resulting from conjugated diene(s) which is greater than 50%.

Thus, for example, diene elastomers such as butyl rubbers or copolymers of dienes and of alpha-olefins of the EPDM type do not fall within the preceding definition, because they may be described as "essentially saturated" diene elastomers (low or very low content of units of diene origin which is always less than 15%).

The following may be used as diene elastomer capable of being used in the compositions according to the invention, in addition to natural rubber:

a homopolymer obtained by polymerization of a conjugated diene monomer having 4 to 12 carbon atoms, or a copolymer obtained by copolymerization of one or more dienes conjugated together or with one or more vinyl-aromatic compounds having 8 to 20 carbon atoms.

Suitable conjugated dienes are, in particular, 1,3-butadiene, 2-methyl-1,3-butadiene, 2,3-di(C1 to C5 alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may for example be block, random, sequential or microsequential elastomers, and may be prepared in dispersion or in solution. They may be coupled and/or starred or alternatively functionalized with a coupling and/or starring or functionalizing agent.

Preferred are polybutadienes, and in particular those having a content of 1,2-units of between 4% and 80%, or those having a content of cis-1,4 of more than 80%, synthetic polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature (Tg) of −40° C. to −80° C., isoprene/styrene copolymers and in particular those having a styrene content of between 5% and 50% by weight and a Tg of between −25° C. and −50° C.

In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

Particularly preferably, the diene elastomer of the composition according to the invention is selected from the group of highly unsaturated diene elastomers which consists of polybutadienes (BR), synthetic polyisoprenes (IR), butadiene/styrene copolymers (SBR), butadiene/isoprene copolymers (BIR), isoprene/styrene copolymers (SIR), butadiene/styrene/isoprene copolymers (SBIR), or a mixture of two or more of these compounds.

According to one preferred embodiment of the invention, said diene elastomer belongs to the group consisting of natural rubber, synthetic polyisoprenes, polybutadienes and copolymers of butadiene and a vinyl-aromatic compound prepared in solution or in emulsion.

More preferably still, the tread is produced with rubber mixes the cross-linked rubber composition of which is based on at least 20 phr (phr: parts by weight per hundred parts of elastomer(s)) and preferably at least 40 phr of natural rubber.

According to the invention, the composition may also advantageously comprise a blend of natural rubber and at least one copolymer of butadiene and a vinyl-aromatic compound prepared in solution.

Advantageously, the cross-linked rubber composition constituting the tread of the tire comprises carbon black as majority or exclusive reinforcing filler.

Suitable carbon blacks are any carbon blacks which are conventionally used in tires, and particularly in treads for tires, in particular the blacks of the type HAF, ISAF and SAF. As non-limitative examples of such blacks, mention may be made of the blacks N115, N134, N234, N339, N347 and N375.

It will be noted that the tread composition according to the invention may also comprise, as reinforcing filler, a blend of carbon black and of a reinforcing inorganic filler, such as silica. "Reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional carbon black filler in its reinforcement function.

To improve still further the endurance performance of the tire, the invention advantageously proposes limiting the risks of shearing and/or of indenting of the carcass plies when the carcass reinforcement is formed of at least two carcass plies. According to such an embodiment of the invention, the distance between the reinforcing threads of said carcass plies and more specifically the distance between the reinforcing threads of said carcass plies in the shoulder zone is greater than 1.5 mm and preferably greater than 2 mm.

The distance between the reinforcing threads is measured from cable to cable, that is to say between the cable of a first ply and the cable of a second carcass ply. In other words, this distance covers the respective thicknesses of the calendering rubber mixes of each of the plies between said cables and any layers of rubber mix incorporated to meet this condition.

The shoulder zone is defined as being the junction zone between the tread and the sidewalls.

According to one advantageous embodiment of the invention, the tread pattern is composed mainly, on either side of the equatorial plane, of bars inclined relative to the circumferential direction to form a V design, or chevron, and said bars have centre lines inclined relative to the circumferential direction such that the ends of the bars close to the equatorial plane penetrate, in the area of contact between the tire and the ground and during rolling of the tire, before the ends close to the axially outer edges of the tread. These ends close to the equatorial plane have a surface which is intended to come into contact with the ground the ratio of the longitudinal dimension to the axial dimension of which is greater than 1. The ratio of these two dimensions on conventional tires for agricultural vehicle is equal to 1.

The inventors have been able to demonstrate that this characteristic of the tire according to the invention permits less-rapid wear, in particular when said tire is used on-road at high speeds.

BRIEF DESCRIPTION OF THE DRAWINGS

Other advantageous details and characteristics of the invention will become apparent hereafter from the description of examples of embodiment of the invention with reference to FIGS. 1 to 4, which represent:

FIG. 2, an enlarged diagram of the shoulder zone of a tire according to the invention illustrating the measurement of the distance U, FIG. 3, another enlarged diagram of the shoulder zone of a tire according to the invention, FIG. 4a, a diagram showing the ends close to the equatorial plane of several bars on the tread of a tire according to a variant embodiment of the invention, FIG. 4b, an enlarged diagram of the end close to the equatorial plane of a bar of a tire according to the variant embodiment of the invention in FIG. 2a.

DETAILED DESCRIPTION OF THE DRAWINGS

The figures are not shown to scale in order to simplify understanding thereof.

Figure 1A:
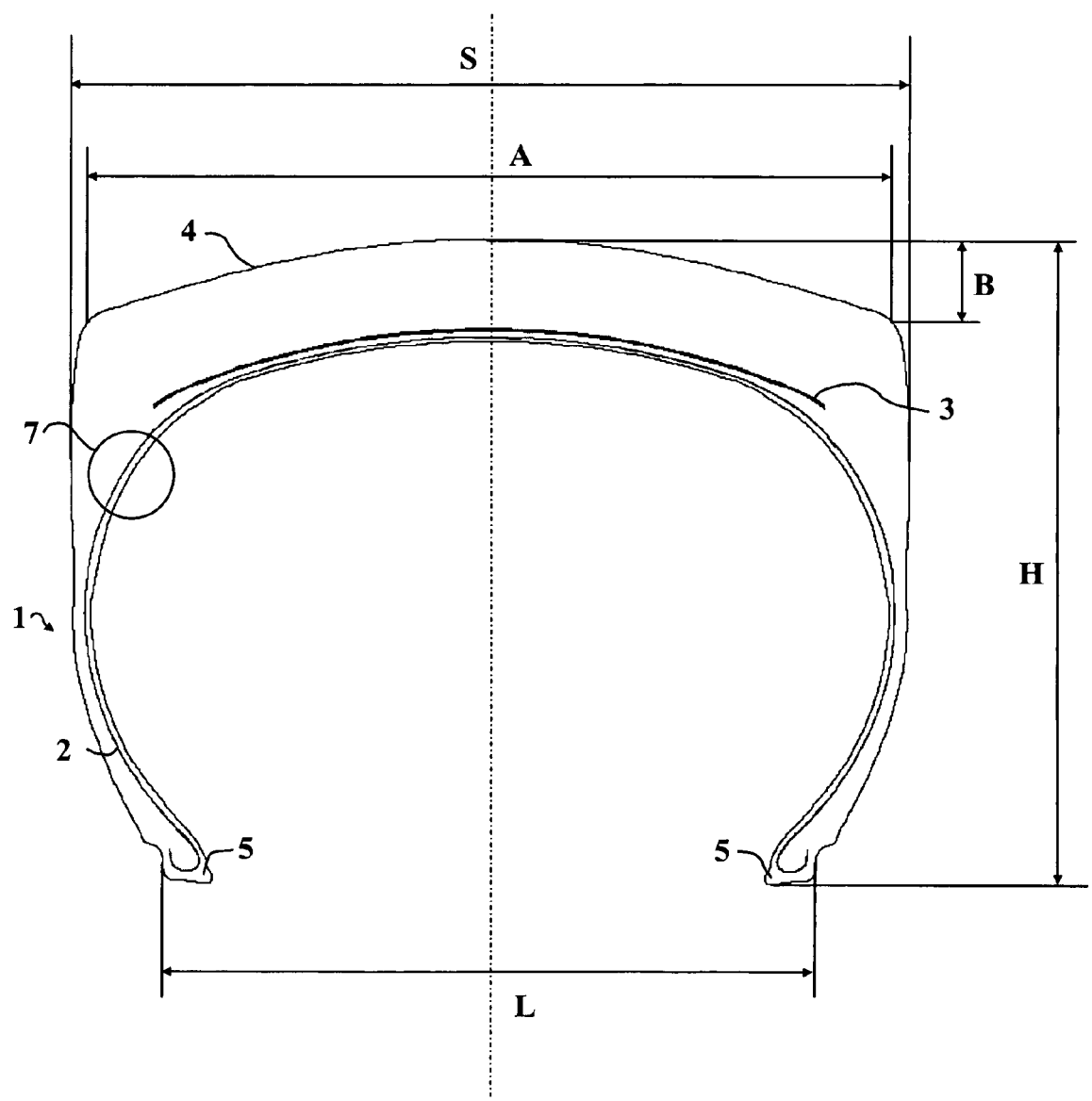
FIG. 1a, a diagram of a tire according to the invention.

FIG. 1a illustrates a diagram of a tire 1, of dimension 650/60 R38, shown mounted and inflated on its mounting rim.

The tire 1 comprises a carcass reinforcement 2 surmounted by a crown reinforcement 3 which itself is surmounted by a tread 4.

The carcass reinforcement 2 comprises two plies 21, 22, of polyester reinforcement elements, oriented radially. The anchoring of the carcass reinforcement 2 in the beads 5, of the type for turning up around a bead wire, not shown, is shown in FIG. 1a; it might also be of the type by association with circumferential reinforcements, the whole being embedded in connecting rubbers.

The crown reinforcement 3 is formed of a plurality of working plies not shown in detail in the figures.

The tread 5 is formed of blocks, or bars 6, not shown in FIG. 1a and appearing in FIG. 4.

The aspect ratio H/S of the tire is 0.60, H being the height of the tire on its rim and S the maximum axial width of the tire, when the latter is mounted on its operating rim and inflated to its recommended pressure.

In accordance with the invention, the ratio of the width of the tread A to the height of deflection of the crown B is greater than 17 and equal to 17.9 in the case of the tire described.

The ratio of the width of the tread A to the maximum axial width S of the tire is greater than 0.9. In the case of the tire shown, this ratio A/S is equal to 0.92.

The product of the ratio A/B, of the width of the tread A to the height of deflection B of the crown, times the ratio A/S, of the width of the tread A to the maximum axial width S of the tire, is greater than 16 and equal to 16.5 in the case of the tire described.

These different values of these products or ratios show that the tire produced according to the invention has on one hand a relatively flat crown compared with that of a conventional tire for agricultural applications and on the other hand a width of tread which is wider than that of a conventional tire for agricultural applications.

As mentioned previously, these characteristics of the tire produced according to the invention permit use thereof by limiting further the risks of damage to crops, in particular by compacting. Furthermore, the tire according to the invention permits use at a pressure less than the pressure usually necessary for tires for agricultural use for conventional loads and dimensions. Furthermore, such a tire according to the invention can be used on hard ground with an identical pressure.

The ratio of the maximum axial width S of the tire to the rim width L is less than 1.2, and in the case of the tire described equal to 1.13.

This value of the ratio S/L indicates mounting on a rim wider than that usually used for tires for agricultural applications.

The tread of the tire is formed of a rubber mix comprising 40 phr of natural rubber and has hysteresis losses HL equal to 30.5±3.

The use of such rubber mixes makes it possible to avoid heating in particular when traveling on hard ground at high speeds.

Figure 1B:
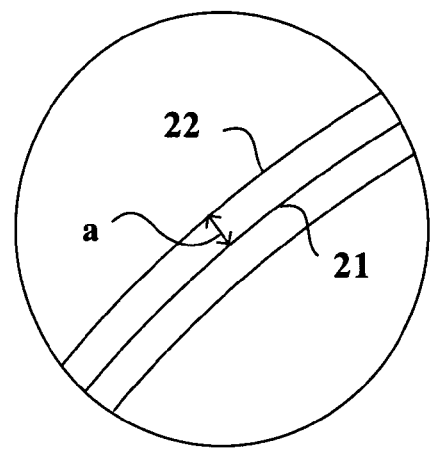
FIG. 1b, an enlarged partial view of part of the diagram of FIG. 1.

FIG. 1b illustrates an enlargement of the zone 7 and indicates the distance "a" between the two carcass plies 21, 22 in particular in this shoulder zone. This distance is equal to 2 mm and makes it possible to avoid shearing of the carcass plies during travel of the tires according to the invention.

Figure 2:
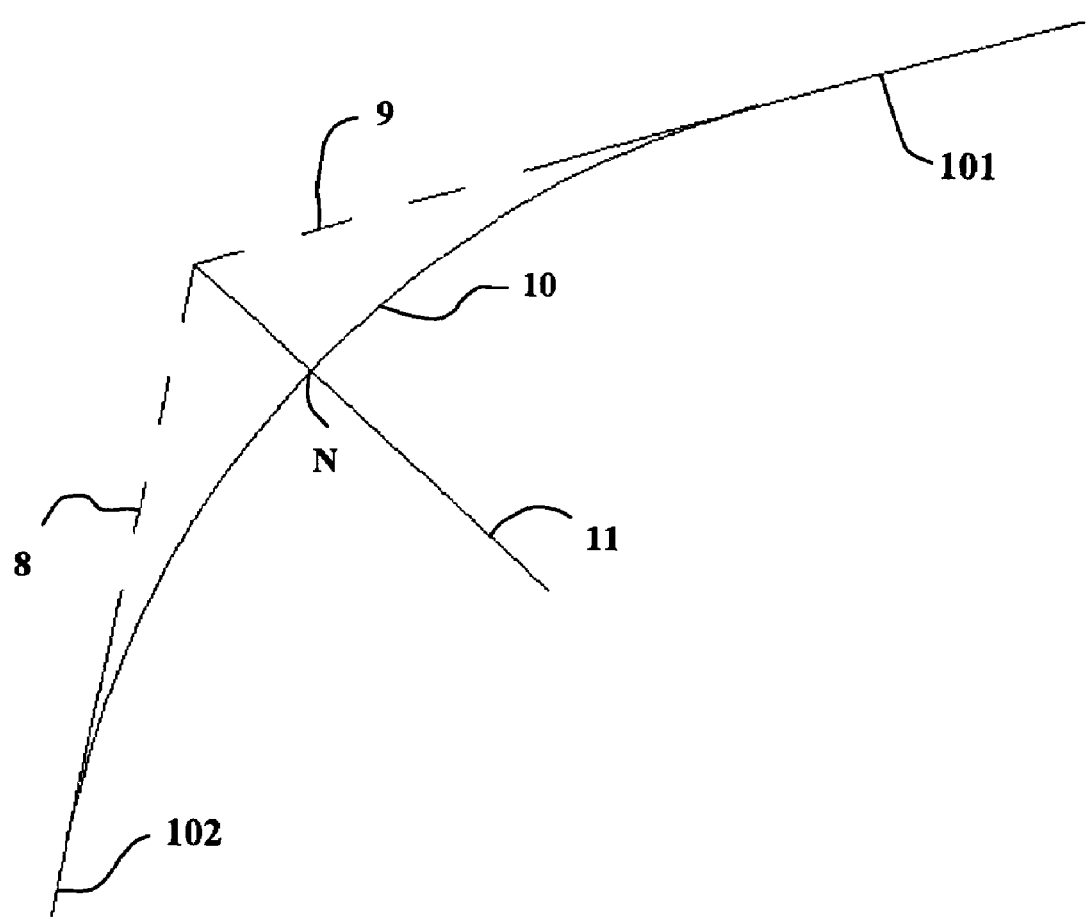

FIG. 2 represents the zone of a shoulder of a tire according to the invention and the trace enabling determination of the shoulder end N. The shoulder end N is defined, in the zone of the shoulder of the tire, by the projection orthogonal to the outer surface 10 of the tire of the intersection of the tangents 8, 9 to the surfaces of an axially outer end of the tread 101 (apex of the bars) on one hand and of the radially outer end of a sidewall 102 on the other hand.

Figure 3:
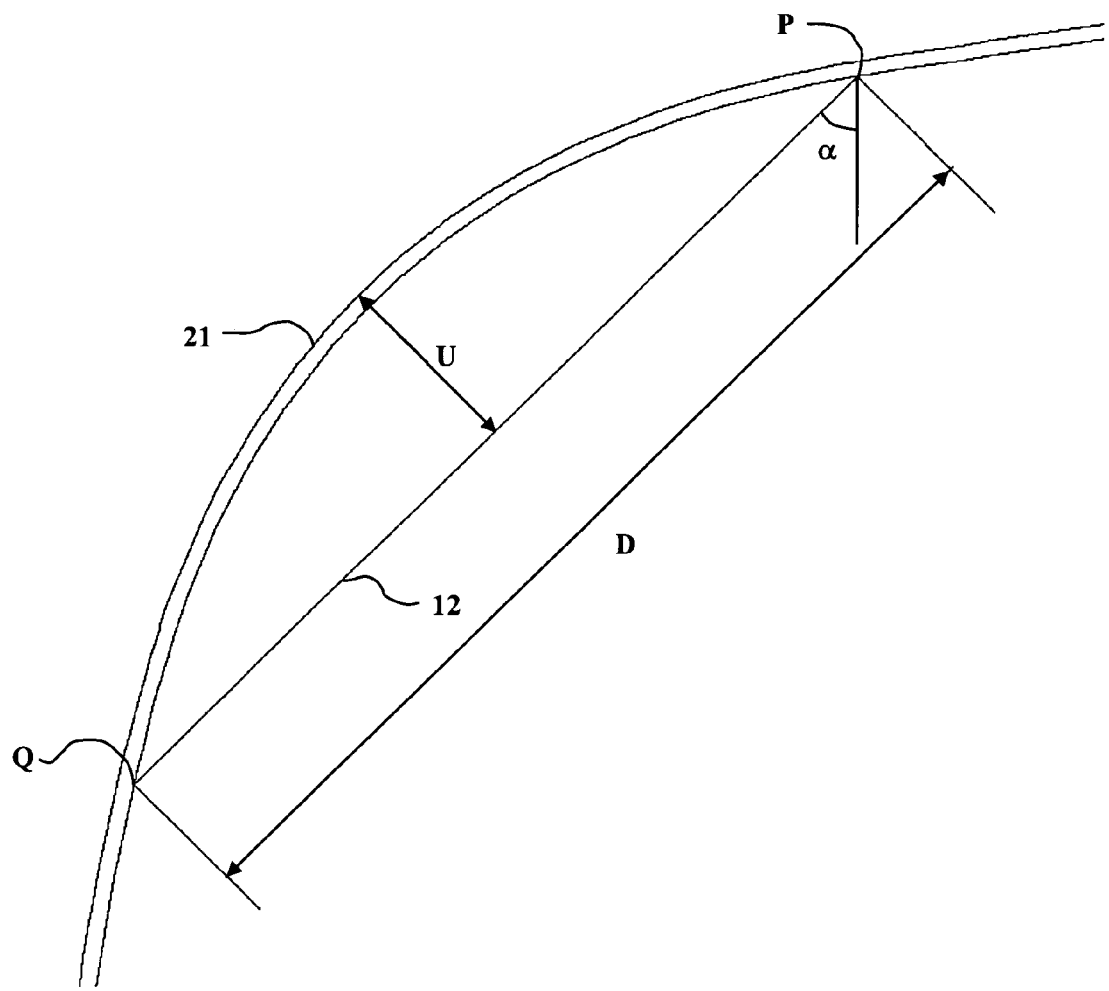

FIG. 3 also shows the zone of a shoulder of a tire according to the invention and the trace making it possible to determine the distance U measured in the direction perpendicular to the orientation of said chord between the radially outermost layer of radially-oriented reinforcement elements, and the centre of the chord 12. The chord 12 has a length D equal to 20% of the maximum axial width S of the tire, and is traced between two points P, Q on the inner wall of the tire to form an angle α of 45° with the direction perpendicular to the axis of rotation. The distance U is between 0.21×D and 0.33×D and in the present case equal to 31 mm.

Figure 4A:
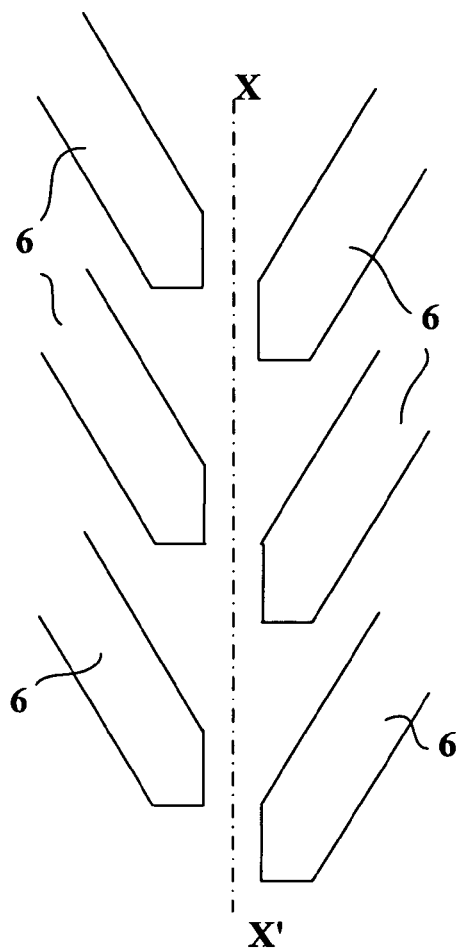

FIG. 4a shows part of the surface of a tire 1 comprising bars 6 of elongate form and of average direction inclined relative to the circumferential direction, represented by the axis XX'. These bars 6 are not shown in their entirety in the figure, which does not represent the entire width of the tread of the tire. These bars distributed on either side of the axis XX' are in the form of a chevron or more exactly a V with offset branches. All the bars 6 have a common direction, which direction is such that the ends axially closest to the equatorial plane XX', upon forward rolling of the tire, are the first to penetrate into the area of contact between said tire and the ground, whereas the ends of the same bars closest to the edges of the tread are last to penetrate into the area of contact. The common direction of the bars is said to correspond to the direction of rotation of the tire.

Figure 4B:
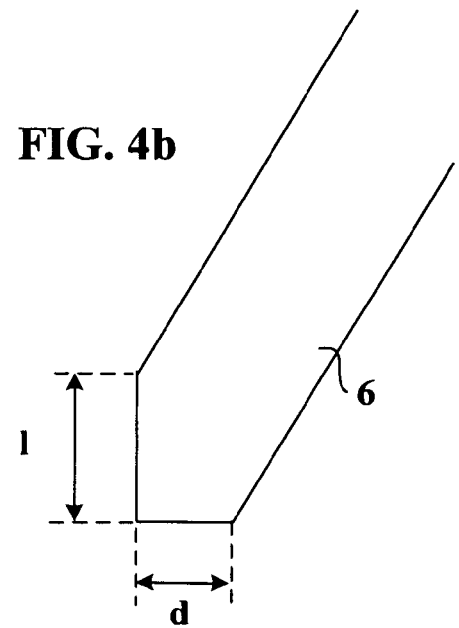

FIG. 4b shows an enlargement of part of a bar 6 and in particular its end closest to the equatorial plane XX'. This end comprises an axial dimension, that is to say one parallel to the direction of the axis of rolling of the tire, and a longitudinal dimension, that is to say one parallel to the longitudinal direction and therefore parallel to the axis XX'. In accordance with the invention, the ratio of these dimensions l/d is greater than 1 and equal to 1.76 in the case of the tire shown.

The tests carried out have shown that such bars make it possible to limit the wear of the tread in particular when traveling on hard ground at speeds of the order of 50 km/h.

The invention claimed is:

1. An agricultural or construction vehicle tire comprising a radial carcass reinforcement radially surmounted by a crown reinforcement, which itself is topped radially by a tread, said tread being joined to two beads by means of two sidewalls, wherein the form ratio H/S is less than 0.75 and wherein the ratio of the width of the tread A to the meridian height of deflection B of the crown is greater than 17.

2. A tire according to claim 1, wherein the ratio of the width of the tread A to the meridian height of deflection B of the crown is less than 37.

3. A tire according to claim 1, wherein the form ratio H/S is less than 0.60.

4. A tire according to claim 1, wherein the ratio of the width of the tread A to the maximum axial width S of the tire is greater than 0.9.

5. A tire according to claim 1, wherein the product of the ratio A/B, of the width of the tread A to the height of deflection B of the crown, times the ratio A/S, of the width of the tread A to the maximum axial width S of the tire, is greater than 14 and preferably greater than 16.

6. A tire according to claim 1, the radial carcass reinforcement comprising at least one layer of radially-oriented reinforcement elements, wherein the distance U between the radially innermost layer of radially oriented reinforcement elements and the centre of the chord, of length D equal to 20% of the maximum axial width S of the tire, forming an angle of 45° with the direction perpendicular to the axis of rotation and placed between two points of the inner wall of the tire, is between 0.21×D and 0.33×D, and wherein the distance U is measured in the direction perpendicular to the orientation of said chord.

7. A tire according to claim 1, mounted on a rim, wherein the ratio of the maximum axial width S of the tire to the rim width L is less than 1.2.

8. A tire according to claim 1, the carcass reinforcement comprising at least two carcass plies, wherein the distance between the reinforcing threads of said carcass plies is greater than 1.5 mm and preferably greater than 2 mm.

9. A tire according to claim 1, wherein the tread is formed of a mix the cross-linked rubber composition of which is based on at least one diene elastomer the molar ratio of units resulting from conjugated diene(s) of which is greater than 50%.

10. A tire according to claim 9, wherein said diene elastomer belongs to the group consisting of natural rubber, synthetic polyisoprenes, polybutadienes and copolymers of butadiene and a vinyl-aromatic compound prepared in solution or in emulsion.

11. A tire according to claim 9, wherein the cross-linked rubber composition is based on at least 20 phr and preferably at least 40 phr of natural rubber.

12. A tire according to claim 9, wherein said composition comprises carbon black as majority or exclusive reinforcing filler.

13. A tire according to claim 1, wherein the tread pattern is composed mainly, on either side of the equatorial plane, of bars inclined relative to the circumferential direction to form a V design, and wherein the ends of the bars close to the equatorial plane have a surface which is intended to come into contact with the ground the ratio of the longitudinal dimension to the axial dimension of which is greater than 1.

* * * * *